United States Patent [19]

Williams et al.

[11] 4,192,973
[45] Mar. 11, 1980

[54] PROCESSOR OVERLOAD ARRANGEMENT IN TIME DIVISION MULTIPLEX EXCHANGES

[75] Inventors: Roger M. Williams, Maidenhead, England; Alan J. Lawrence, Stamford, Conn.

[73] Assignee: Plessey Handel und Investments AG, 6300 Zug, Switzerland

[21] Appl. No.: 869,152

[22] Filed: Jan. 13, 1978

[30] Foreign Application Priority Data

Jan. 18, 1977 [GB] United Kingdom ............... 1875/77

[51] Int. Cl.$^2$ ............... H04Q 1/22; H04Q 11/04
[52] U.S. Cl. ............... 370/53; 179/18 ES; 370/13; 370/77
[58] Field of Search ............... 179/15 BF, 175.2 C, 179/175.2 R, 175.23, 18 D, 175.21, 18 ES, 18 EA, 15 BY

[56] References Cited

U.S. PATENT DOCUMENTS

| | | | |
|---|---|---|---|
| 3,449,520 | 6/1969 | Höschler et al. | 179/15 BF |
| 3,828,136 | 8/1974 | Perna et al. | 179/15 BF |
| 3,995,118 | 11/1976 | Chao | 179/15 BF |

*Primary Examiner*—Thomas W. Brown
*Attorney, Agent, or Firm*—Fleit & Jacobson

[57] ABSTRACT

This invention is concerned with a processor-overload relief facility in a time division multiplex (t.d.m.) processor-controlled exchanges. Under overload conditions rejection of new calls may be required until this condition is relieved and this proposal is to meet the relief function by peripheral hardware while retaining the ability to process emergency (999) calls during overload. An incoming signalling unit which is responsive to incoming seize, dialling and other signals, is provided with multi-bit stores on a one per channel basis; each such store interfacing with processor on a read/write basis. Normally the signalling unit responds to any incoming channel-seized condition and sets the 'seize' bit (S) in the appropriate channel store which reports seizure to the processor. Dialled pulses are detected and accumulated in the store, and each complete digit is transferred to the processor for call control purposes. During overload conditions a common control circuit inhibits (except in the case of channel stores already receiving an S signal) certain normal transfer paths between the signalling unit and channel stores but a transfer path is left open if a 999 call is received on a level 9 circuit of the exchange, so that a new seize signal can be diverted to another storage location whereupon a "999 signal with channel identity" is transmitted to the processor.

9 Claims, 1 Drawing Figure

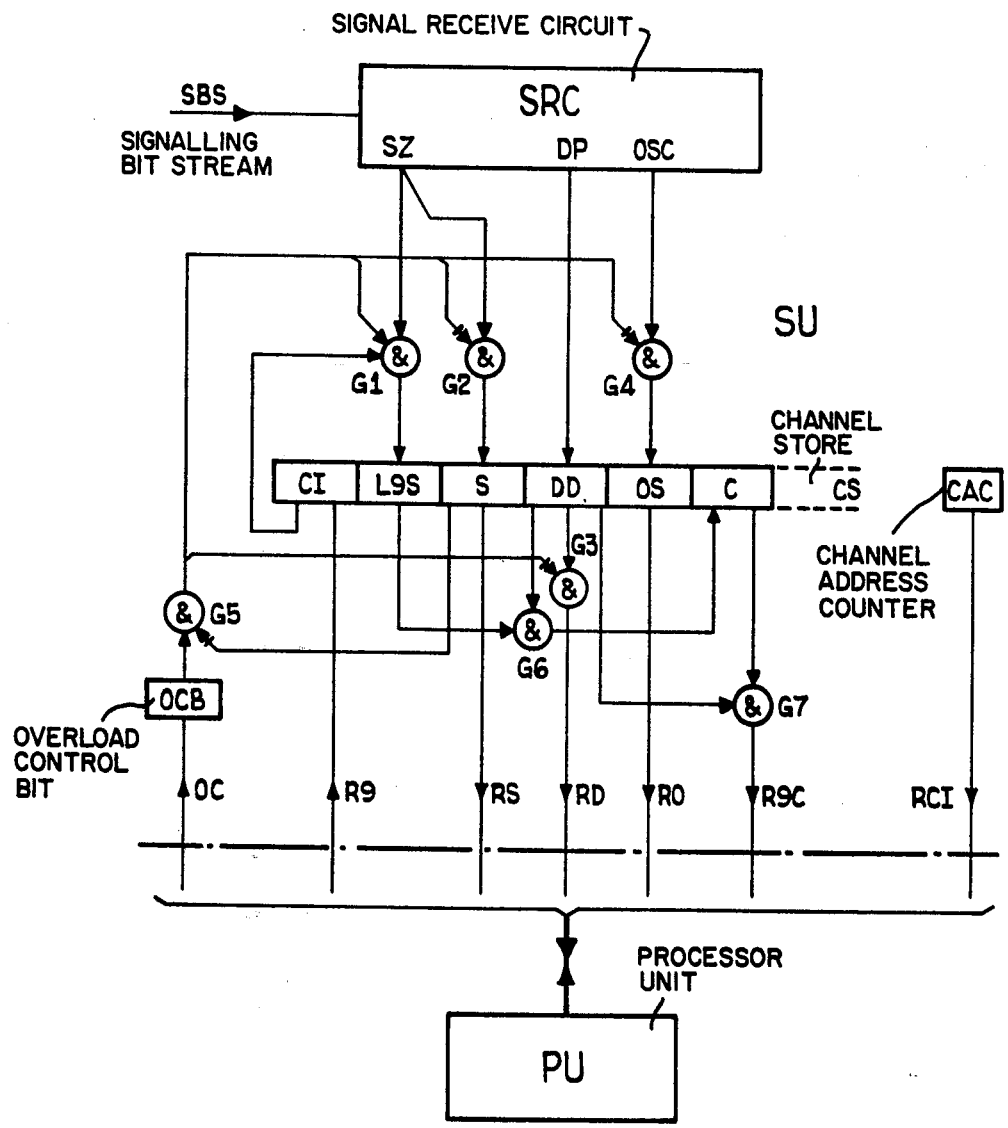

PROCESSOR OVERLOAD ARRANGEMENT IN TIME DIVISION MULTIPLEX EXCHANGES

This invention relates to signalling units for use time division multiplex (t.d.m.) processor-controlled telecommunication exchanges. For example, the present invention is especially applicable to stored program controlled (s.p.c.) telephone exchanges in which telephone calls are switched employing time division multiplex (t.d.m.) channels employing pulse code modulation and in which due to the lack of processing resources calls cannot be handled.

In such an exchange, lack of processing resources could be overcome by rejecting new calls, with minimum processing, until processing overload conditions are reduced. This invention provides means, in the form of hardware associated with the signalling logic, to enable as much as possible of the new-call rejection mechanisms to be affected.

According to the present invention there is provided a signalling unit for use in a time division multiplex processor controlled telecommunication exchange comprising a combination; storage means for each channel in a time division multiplex highway, for storing ordinary and emergency call signalling information preparatory to being transmitted to the processor and; processor overload detection means; and further comprising in combination; means for transmitting signalling-information transmission to the processor; and means for receiving signals from the processor; and when a processor overload condition occurs, a signal is transmitted by way of the signal transmission means to activate the processor overload detection means whereupon the transmission of signalling information from the storage means by way of the means for transmitting signalling information is inhibited except in respect of signalling information for emergency calls.

The storage means can take the form of a memory having individual storage locations for storing signal information relating to each time-division-multiplex channel.

In carrying out the invention the processor overload detection means can be associated with the signalling unit and will take the form of a bistable or like device.

The signalling-information transmission-means and the signal transmission-means form part of a multiconductor path connecting the signalling unit with the processor.

In operation the processor detects and indicates an overload condition which is then signalled to the signalling unit where an overload signal is detected and stored in the bistable device. This provides an inhibit signal which inhibits the writing of new signalling-information into the storage means, except for such signalling information in respect of emergency (999) calls and dial pulses. Accordingly only emergency call signalling-information is transmitted to the processor.

An embodiment of the present invention will now be described, by way of example, and with reference to the accompanying drawing which shows the interface arrangements to the processor in the time division multiplex (t.d.m.) exchange.

Before embarking upon the detailed description of this invention, it is necessary to appreciate more precisely the type of exchange with which this invention is involved. The type of exchange concerned employs so-called space-switching stages and time-switching stages. The space-switching stage is a co-ordinate matrix arrangement having electronic co-ordinate switches, whereas the time-switching stage employs delay lines, shift registers or random access memories.

In one example of a t.d.m. exchange system involving a time-space-time switching structure, the incoming time-division-multiplexed signals received at the exchange by way of a "receive" t.d.m. highway, are segregated into their separate channels. Each "receive" time-division-multiplex (t.d.m.) highway is provided with a dedicated "receive" storage-arrangement having one location for each "receive" t.d.m. channel. Similarly each exchange "transmit" t.d.m. highway is provided with a "transmit" storage-arrangement having one location for each "transmit" t.d.m. channel. A number of "receive" storage devices, typically of the order of 8 or 16, are served by a single "receive" superhighway while the corresponding "transmit" storage devices are served by a "transmit" superhighway. The superhighways carry information characters in parallel and may be operated for example at (or a multiple of) the t.d.m. bit rate. The "receive" superhighways and the transmit superhighways are interconnected by an electronic switching network whose crosspoints are operated, on a t.d.m. basis, in accordance with the operating bit-rate of the superhighways. The "receive" storage arrangements and the "transmit" storage arrangements provide thee time-switching function while the electronic switching network interconnecting the storage arrangements provides the space-switching function.

Referring now to the drawing it can be seen that there is a signalling unit SU. It includes a memory or channel store CS which contains per-channel storage and which can be read from and written to by the processor so that in the "transmit" direction, channel signals can be repeated in successive t.d.m. frames after a single processor instruction, whereas in the "receive" direction channel signals in successive t.d.m. frames can be analysed for persistence before being reported to the processor.

The relevant parts of the signalling unit SU, which is fed with the signalling bit-stream SBS, are shown in the circuit diagram. The channel-address-counter CAC accesses each channel storage element while the seize condition SZ, and reception of dial pulses DP are identified in separate signal-receive circuits SRC. Other signals (not shown) include clear and busy for example which are indicated by the receive circuit OSC and such signals are stored in location OS in the channel store CS. The paths OC, R9, RS, RD, RO, R9C and RCI are all part of a multiconductor path between the signalling unit SU and the processor unit PU, the paths OC and R9 forming means for receiving signals and the paths, RS, RD, RO, R9C and RCI forming means for transmitting signalling-information.

In normal operation the unit identifies the seize condition SZ and sets a bit in a 'seize' location S in the channel store CS, and also reports the seize condition to the processor PU by way of path RS. Subsequently dial pulses DP are identified, accumulated as a digit in a 'dial digit' location DD in the channel store and the digits are forwarded to the processor PU, as they occur, by way of AND-gate G3 and the path RD. At cleardown, the channel store CS is cleared except for a level 9 circuit condition CI registered in the channel store CS.

The mechanism for overload control resides in the signalling unit SU as follows:

An overload control bit OCB common to all channels, and representing processor overload detection means, is set by an overload signal from the processing unit PU by way of path OC, in the event of a processor overload condition occurring, and this gives rise to the generation of an instruction 'Inhibit seize messages to the processor'.

Providing there is no seize condition in location S in this store, this instruction is effected, as AND-gate G5 is opened, whereupon an inhibit signal inhibits any channel associated actions by way of AND-gates G2 and G4 in the signalling unit SU subsequent to the seize on a channel. If a call is in progress i.e. a seize SZ condition exists on a channel, the inhibit condition will aply only after the channel is cleared.

When a 999 call arrives on a level 9 circuit, the circuit identification thereof is held in channel store location 'circuit identification' CI. This signalled from the processor PU by way of the path R9. If a seize SZ signal is received on a level 9 circuit in the inhibited state, AND-gate G1 is opened and a further bit is set in the location 'level 9 signal' L9S in the channel store CS. If now two digit 9's are assembled in location 'dial digits' DD in the channel store CS, then AND-gate G6 is opened and a bit is set in location 'count' C in the channel store CS. AND- gate G7 is then opened and a '999 call and channel identity' message is sent by way of paths R9C and RCI respectively to the processor PU. This can be treated as a priority in the processor.

If graded control of call rejection is required, then an overload control bit OCB can be provided per channel (held in the channel store) or per group of channels, each of these can be separately set by the processor.

While this invention has been described in connection with a telephone exchange it could also be applied to a telecommunication exchange where information transmission and switching involves telegraph calls or t.d.m. data messages between remote users of computer equipment.

What we claim is:

1. A signalling unit for use in a time division multiplex processor-controlled telecommunication exchange comprising in combination;

storage means for each channel in a time division multiplex highway for storing ordinary and emergency call signalling information preparatory to being transmitted to the processor;

processor overload detection means, further comprising in combination;

means for transmitting signalling information to the processor and;

means for receiving signals from the processor; whereby when a processor-overload condition occurs, a signal is transmitted by way of the means for receiving signals to activate the processor overload detection means whereupon the transmission of signalling information from the storage means by way of the means for transmitting signalling information is inhibited except in respect of signalling information for emergency calls.

2. A signalling unit as claimed in claim 1 wherein the storage means is a memory having individual storage locations for storing signal information relating to each time division multiplex channel.

3. The signalling unit as claimed in claim 2 wherein; the means for transmitting signalling information and the means for receiving signals form part of a multiconductor path connecting the signalling unit with the processor.

4. The signalling unit as claimed in claim 3 wherein the processor detects and indicates an overload condition and the said overload condition is signalled by means of an overload signal to a bistable device which stores the said overload signal.

5. The signalling unit as claimed in claim 4 wherein said signal transmitted by way of the means for receiving signals is operative upon gates to prevent a seize signal and other signals in respect of an ordinary call from being registered in the storage means.

6. The signalling unit as claimed in claim 5 wherein when an emergency call is indicated, the circuit identification thereof is held in a 'circuit identification' location in the storage means.

7. The signalling unit as claimed in claim 6 wherein, a seize condition representative of an emergency call is received in a 'seize' location in the storage means and, when an inhibit signal is operative, a bit is set in a 'level 9 signal' location in the storage means.

8. The signalling unit as claimed in claim 7 wherein when two digits of the seize condition representative of an emergency call number are assembled in a 'dial digits' location in the storage means, a bit is set in a location 'count' in the storage means.

9. The signalling unit as claimed in claim 8 wherein, a priority 'emergency-call and channel identity' message is transmitted to the processor from a gate opened as a result of two dialled digits being assembled in a 'dialled digits' location in the storage means and a bit is set in a 'count' location in the storage means.

* * * * *